United States Patent
Farnsworth et al.

(10) Patent No.: US 8,000,713 B2
(45) Date of Patent: Aug. 16, 2011

(54) APPARATUS AND METHOD FOR IMPLEMENTING DETECTION OF SYSTEM INFORMATION CHANGES IN UNIVERSAL MOBILE TELECOMMUNICATIONS SYSTEMS

(75) Inventors: Andrew John Farnsworth, Marlbrook (GB); Gideon Roberts, Stone (GB)

(73) Assignee: Research In Motion Limited, Waterloo (CA)

(*) Notice: Subject to any disclaimer, the term of this patent is extended or adjusted under 35 U.S.C. 154(b) by 725 days.

(21) Appl. No.: 12/050,352

(22) Filed: Mar. 18, 2008

(65) Prior Publication Data
US 2008/0160981 A1    Jul. 3, 2008

Related U.S. Application Data

(63) Continuation of application No. 10/754,735, filed on Jan. 9, 2004, now Pat. No. 7,346,353.

(51) Int. Cl.
*H04Q 7/20*    (2006.01)

(52) U.S. Cl. .............. 455/446; 455/447; 455/449
(58) Field of Classification Search .......... 455/446, 455/448, 432.2, 434.3, 434, 435.1–435.3, 455/445; 370/331, 337
See application file for complete search history.

(56) References Cited

U.S. PATENT DOCUMENTS

| 5,404,355 A | 4/1995 | Raith |
| 6,628,946 B1 * | 9/2003 | Wiberg et al. ............. 455/434 |
| 2004/0166891 A1 * | 8/2004 | Mahkonen et al. ......... 455/550.1 |
| 2005/0148349 A1 * | 7/2005 | Putcha et al. ............. 455/458 |

FOREIGN PATENT DOCUMENTS

WO    00/72609 A1    11/2000

* cited by examiner

*Primary Examiner* — Melur Ramakrishnaiah

(57) ABSTRACT

In a mobile telecommunications system comprising a network of a plurality of cells and at least one user equipment device, the user equipment is arranged, when the user equipment re-configures itself to enter a new state or performs cell reselection, to read broadcast system information and, when the broadcast system information indicates a change in system information, to update the system information of the user equipment device.

8 Claims, 8 Drawing Sheets

APPARATUS AND METHOD FOR IMPLEMENTING DETECTION OF SYSTEM INFORMATION CHANGES IN UNIVERSAL MOBILE TELECOMMUNICATIONS SYSTEMS

CROSS-REFERENCE TO RELATED APPLICATION

The present application is a continuation application of co-pending patent application Ser. No. 10/754,735 filed on Jan. 9, 2004, the contents of which are incorporated herein by reference.

BACKGROUND

1. Technical Field

This application relates to UMTS (Universal Mobile Telecommunications System) in general, and to an apparatus and method for implementing broadcast system information changes.

2. Description of the Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a typical cellular radio system, mobile user equipment (UE) communicates via a radio access radio network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

The radio access network covers a geographical area divided into a plurality of cell areas. Each cell area is served by at least one base station, which may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device, generally referred to as user equipment (UE), that complies with the 3GPP specifications for the UMTS protocol. The 3GPP 25.331 specification, v.3.15.0, referred to herein as the 25.331 specification, addresses the subject of UMTS RRC (Radio Resource Control) protocol requirements between the UMTS Terrestrial Radio Access Network (UTRAN) and the UE.

Clause 8.1.1 of the 25.331 specification, relates to the broadcast of system information. The UTRAN sends system information to a UE by means of a message that comprises a Master Information Block (MIB) and a plurality of System Information Blocks (SIBs). The MIB provides references and scheduling information for a number of system information blocks. A system information block groups together system information elements (IEs) of the same nature. Different system information blocks may have different characteristics, e.g. regarding their repetition rate and the requirements on UEs to re-read the system information blocks. The system information blocks contain the actual system information. The master information block may optionally also contain reference and scheduling information to one or two scheduling blocks, which give references and scheduling information for additional system information blocks. Scheduling information for a system information block is included in either the master information block or one of the scheduling blocks.

When a UMTS cell is selected by a mobile device, the master information block (MIB) is read on the broadcast control channel (BCCH) followed by the appropriate system information blocks (SIBs).

The Paging CHannel (PCH) channel needs to be setup by the mobile device if in Idle, Cell_PCH, or URA_PCH state. Information required to configure the PCH is included in system information block type 5 (SIB5).

If the Universal Terrestrial Radio Access Network (UTRAN) needs to change any of the system information blocks, it informs the mobile devices (UEs) in the cell. This is achieved by the UTRAN sending SYSTEM INFORMATION as illustrated generally in FIG. 1. As illustrated in FIG. 2, for UEs in Idle, Cell_PCH, or URA_PCH states, a PAGING TYPE 1 message (with the information element BCCH modification info included) is sent via PCH to alert a UE that there is a change in system information. A separate mechanism is used to alert a UE in Cell_FACH if there is a change in system information. This entails using a SYSTEM INFORMATION CHANGE INDICATION message sent on one or more Forward Access CHannels (FACHs) (as illustrated in FIG. 3).

There is a problem in that a PAGING TYPE 1 message sent after the cell is selected but before the UE has configured the PCH will be missed. For UEs in Cell_FACH state, a SYSTEM INFORMATION CHANGE INDICATION message sent after the cell is selected but before the UE has configured the FACH will also be missed.

In these cases, the UE will be using incorrect/out-of-date system information blocks. This could cause the UE to be unusable in the current cell or have other undesirable effects.

An additional case is where the PAGING TYPE 1 or SYSTEM INFORMATION CHANGE INDICATION message indicates a system information change will occur at a specific time (up to 4096 frames or 40.96 seconds in the future). The SIBs are transmitted by the UTRAN in a cycle which repeats every 4096 frames (40.96 seconds). Here, if the UTRAN sends these messages before the UE selects the cell, the system information change will again be missed by the UE.

There are thus proposed strategies for dealing with the broadcast of system information. A number of such strategies are detailed below.

Other aspects and features of the present invention will become apparent to those ordinarily skilled in the art upon review of the following description of specific embodiments of an apparatus and method for handling the broadcast of system information in UMTS.

BRIEF DESCRIPTION OF THE DRAWINGS

Embodiments of the present invention will now be described, by way of example only, with reference to the attached drawings, in which.

The same reference numerals are used in different figures to denote similar elements.

DETAILED DESCRIPTION OF THE DRAWINGS

A method and apparatus for implementing broadcast system information changes is described. In the following description, for the purposes of explanation, numerous specific details are set forth in order to provide a thorough understanding of the present invention. It will be apparent, however, to one skilled in the art that the present invention may be practised without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method for broadcasting and/or implementing system information changes in a mobile telecommunications system. In other aspects, the invention encompasses apparatus and a computer-readable medium configured to carry out the foregoing steps. In particular, the method may be implemented in a mobile telecommunications device, with or without voice capabilities, or other electronic devices such as handheld or portable devices and/or within the network.

Figure 1:
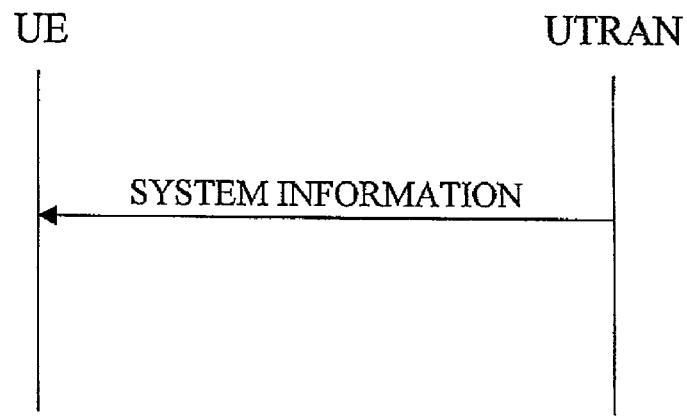
FIG. 1 illustrates the broadcast of system information in a UMTS system.
Figure 2:
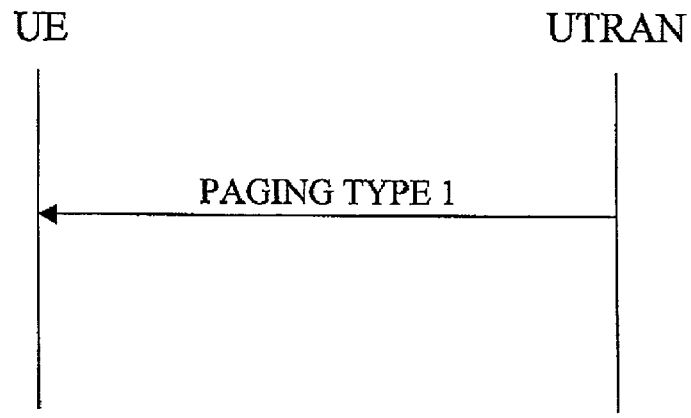
FIG. 2 illustrates notification of system information modification for UEs in Idle, Cell_PCH, or URA_PCH states.
Figure 3:
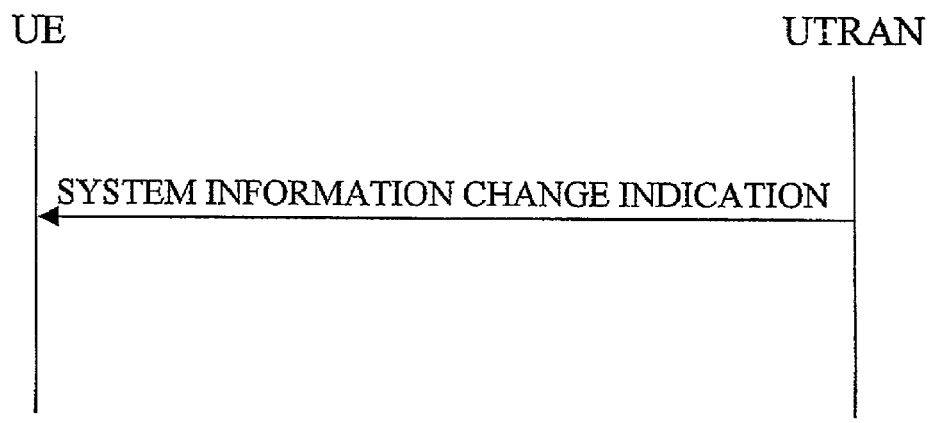
FIG. 3 illustrates notification of system information modification for UEs in CELL_FACH state.
Figure 4:
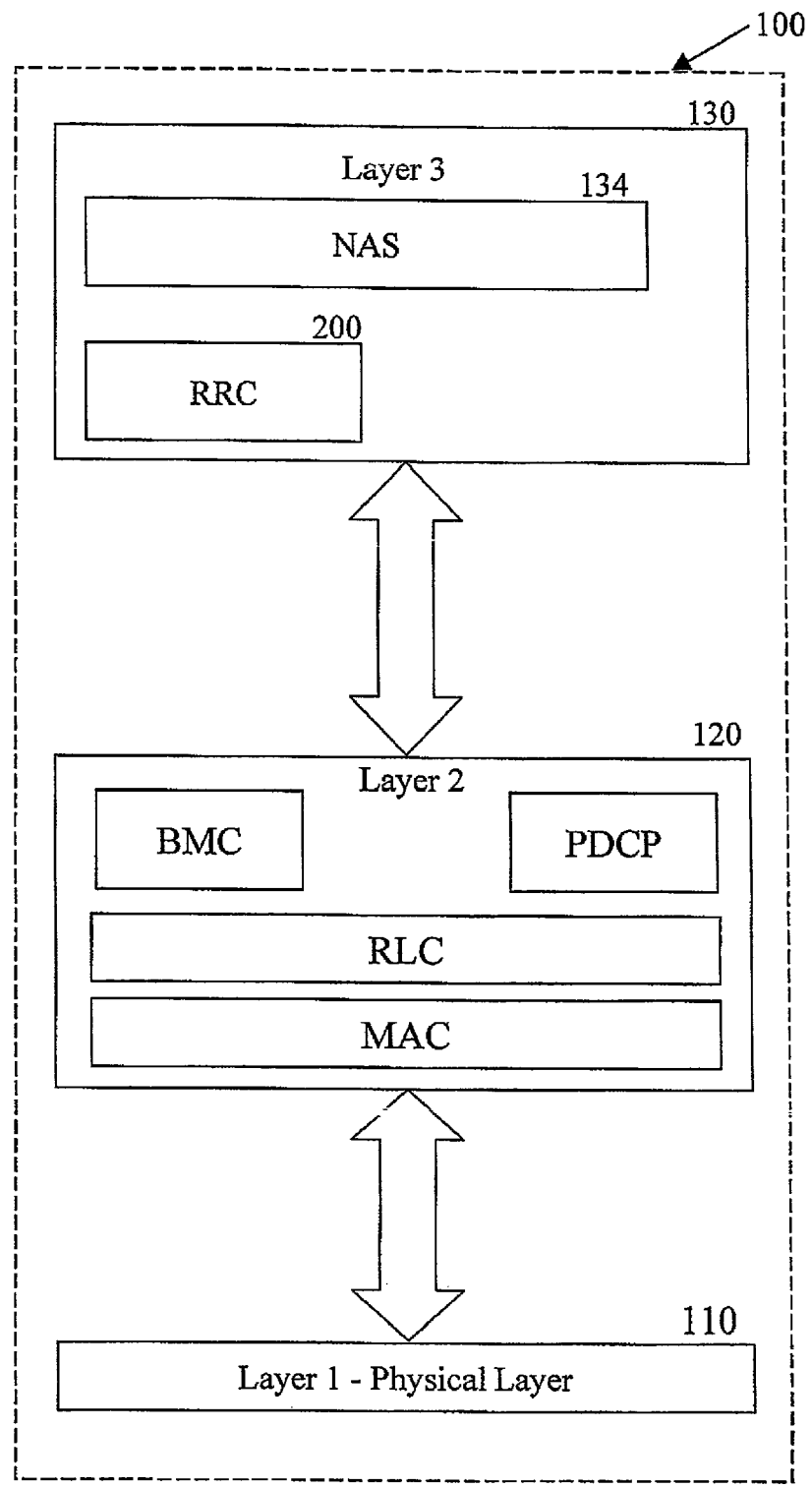
FIG. 4 is a block diagram illustrating an embodiment of a protocol stack apparatus.

Referring to the drawings, FIG. 4 is a block diagram illustrating an embodiment of a protocol stack apparatus. The RRC block 200 is a sub layer of Layer 3 130 of a UMTS protocol stack 100. The RRC 200 exists in the control plane only and provides an information transfer service to the non-access stratum NAS 134. The RRC 200 is responsible for controlling the configuration of radio interface Layer 1 110 and Layer 2 120. When the UTRAN wishes to change the UE configuration it will issue a message to the UE containing a command to invoke a specific RRC procedure. The RRC 200 layer of the UE decodes this message and initiates the appropriate RRC procedure.

Figure 5A:
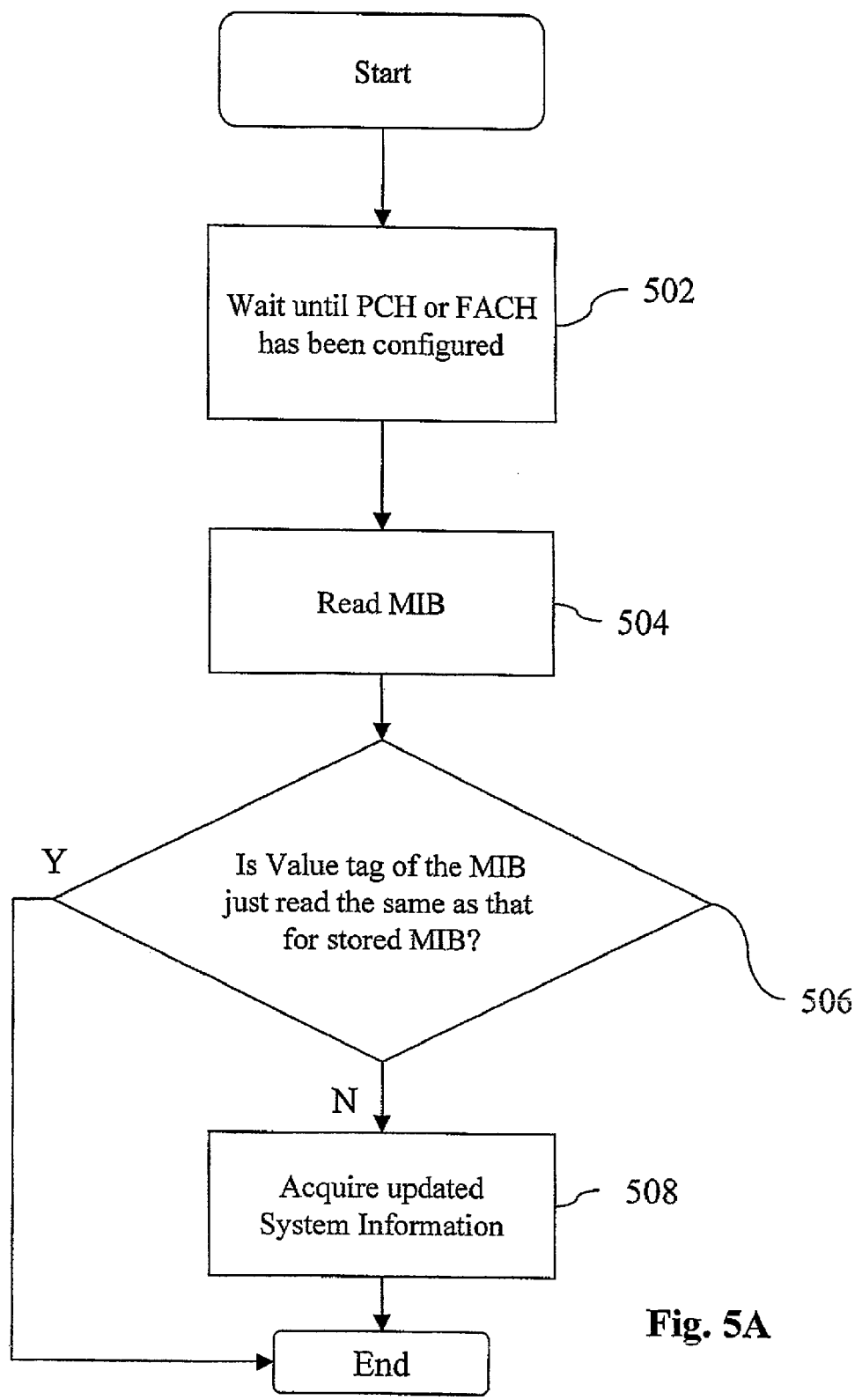
FIG. 5A is a flowchart illustrating a solution in the UE for non-deferred system information changes.

FIG. 5A is a flowchart that illustrates a first embodiment implemented on a UE device. Once the UE has configured the PCH (for UEs in Idle, Cell_PCH and Ura_PCH states) or FACH (UEs in Cell_FACH state) (step 502), the MIB is re-read by the UE (step 504). If the value tag of the MIB is different from the value tag of the previous MIB (for instance as stored by the UE when selecting the cell) (step 506), the UE acquires the updated system information blocks (step 508). If the value tags are identical (step 506), no further action is necessary.

Figure 5B:
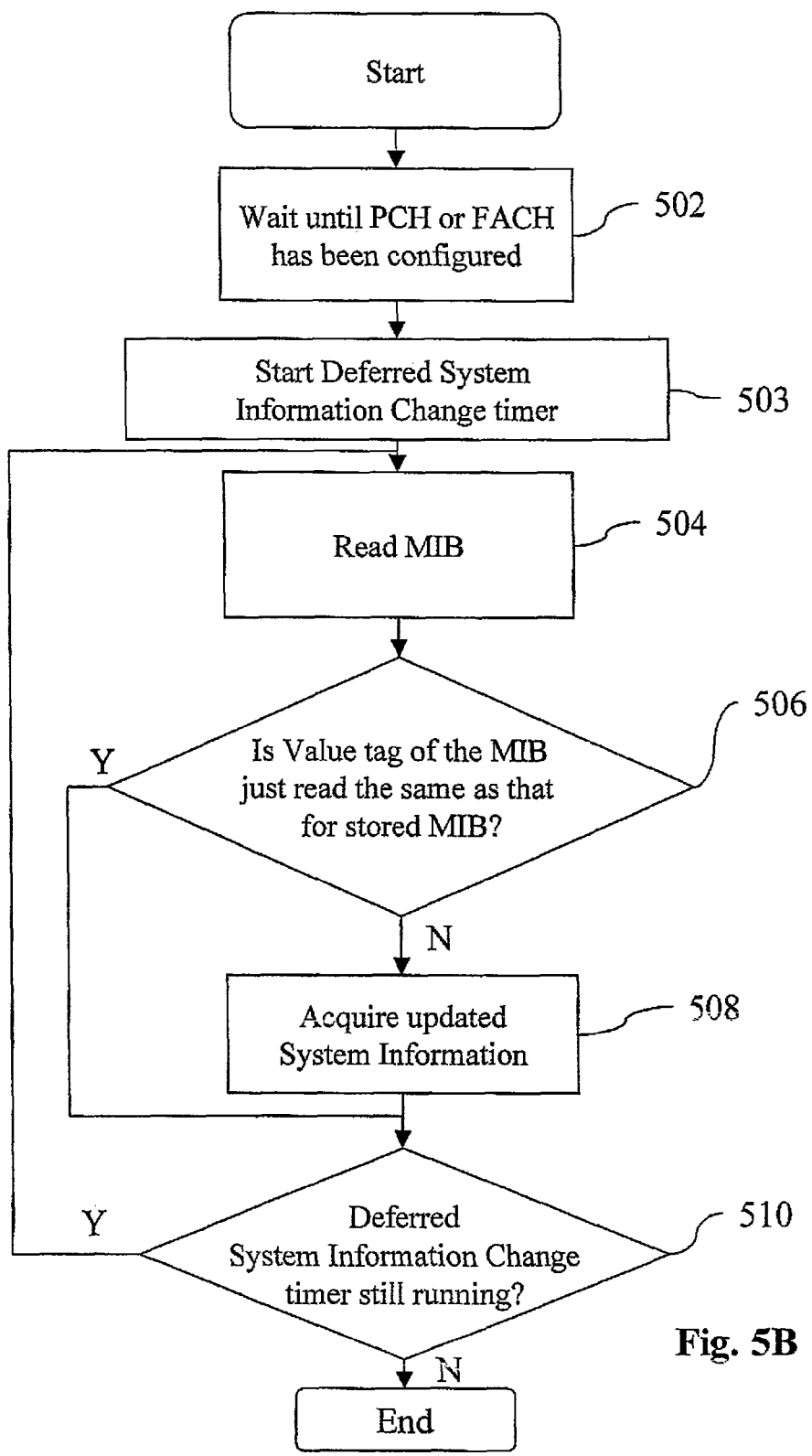
FIG. 5B is a flowchart illustrating a solution in the UE for deferred system information changes.

This solution solves the problem for BCCH modification information which indicates an immediate system information change. However, to solve the problem where a system information change is deferred, the MIB is re-read at intervals during the maximum possible deferral period. This is illustrated in FIG. 5B. Once the UE has configured the PCH or the FACH (step 502), a Deferred System Information Change timer is started (step 503). The MIB is then read (step 504) and the value tag of the MIB and that stored in the UE are compared (step 506). If the Value tags are different then the UE acquires the updated System Information (step 508). Once the value tag has been compared (step 506) and any updated System Information acquired (step 508), the UE then determines whether the Deferred System Information Change timer is still running (step 510). If the Deferred System Information Change timer has not yet expired, the MIB is re-read (step 504). If the timer has expired, then the process ends. A typical value for the period of the Deferred System Information Change timer is 40.96 seconds i.e. one system information transmission cycle. The UE may be arranged to read every MIB broadcast during the period set by the Deferred System Information Change timer or a subset of the MIBs broadcast in this period.

Figure 6A:
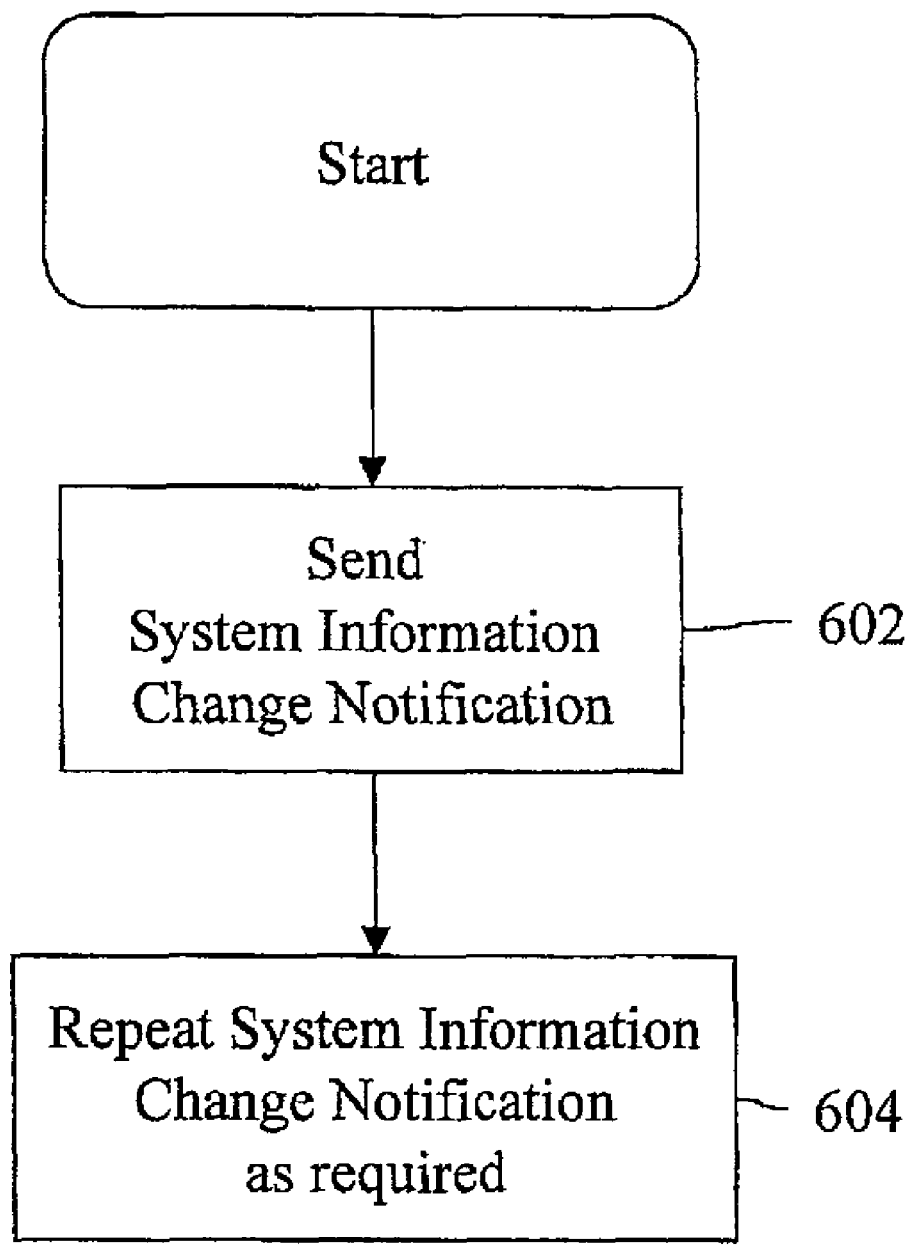
FIG. 6A is a flowchart illustrating a solution in the UTRAN for non-deferred system information changes.

FIG. 6A is a flowchart that illustrates an embodiment implemented in the UTRAN rather than at the UE. In this implementation, when system information needs to be changed, the UTRAN broadcasts a notification of the intent to change system information (for instance, in a PAGING TYPE 1/SYSTEM INFORMATION CHANGE INDICATION message) a first time (step 602) and then broadcasts at least one repeat of the notification of system information change in a PAGING TYPE 1/SYSTEM INFORMATION CHANGE INDICATION message to notify a UE of the intent to change system information (step 604).

For instance, when the UE is in Cell_FACH, the notification of system information change is sent as an Information Element (IE) "BCCH modification info" contained in a SYSTEM INFORMATION CHANGE INDICATION message transmitted on the Broadcast control channel (BCCH) mapped on at least one Forward Access Channel (FACH) on every Secondary CCPCH in the cell. The repeat of the notification of system information change is also sent in this manner.

The UTRAN may be arranged to repeat more than once the notification of the intent to change system information. One example of the time period between the repeat transmissions is a time period comparable with the maximum time for the UE to configure the PCH/FACH channel after reading system information prior to selecting the cell (e.g. 500 ms). Ideally, each UE should then receive at least one notification of the intent to change system information as sent in the PAGING TYPE 1/SYSTEM INFORMATION CHANGE INDICATION messages. Thus the UTRAN may repeat transmission of the notification of the intent to change system information in a PAGING TYPE 1 or a SYSTEM INFORMATION CHANGE INDICATION message to a UE to increase the probability of proper reception of notification of the intent to change system information.

To allow for deferred system information changes, the UTRAN may repeat the PAGING TYPE 1/SYSTEM INFORMATION CHANGE INDICATION messages up to the time the change occurs.

In another implementation in the UTRAN, for deferred system information changes, the repeat of the notification of system information change is sent by the UTRAN at a time close to the intended change in the system information. For example, for deferred system information changes, the repeat is sent in a time interval prior to the time at which the system information is to be changed. In UMTS, a Transmission Time Interval (TTI) is defined which is the inter-arrival time of a TBS (Transport Block Set), and is equal to the periodicity at which a Transport Block Set is transferred by the physical layer on the radio interface. It is a multiple of the minimum interleaving period (e.g. 10 ms, the length of one RF (Radio Frame)). The MAC (Medium Access Control) in Layer 2 120 (see FIG. 4) delivers one Transport Block Set to the physical layer 110 every TTI.

In one embodiment, the repeat of the notification of system information change is sent in a TTI that occurs before the system change is to be implemented. The repeat may be sent in the TTI (X-1) immediately before the TTI (X) in which the system information is to be changed. This implementation is particularly applicable for sending SYSTEM INFORMATION CHANGE INDICATION on one or more FACHs, as a UE in the Cell_FACH RRC state continuously monitors its configured FACH(s) for messages.

Alternatively, for a particular UE, the repeat may be sent in a TTI (X-n) before the TTI (X) in which the system information is to be changed, where the TTI (X-n) represents a TTI to which the particular UE will listen by default. For instance, for a UE which listens on TTI 0, 8, 16, 24 etc. the repeat may be sent in any of these time intervals that occur before the system change is to be implemented. The UE will therefore by default listen at the required time interval. This implementation is particularly attractive in Discontinuous Reception (DRX) mode, in which the UE listens only to the paging channels within its DRX group and the network pages the mobile in that group of paging channels.

Figure 6B:
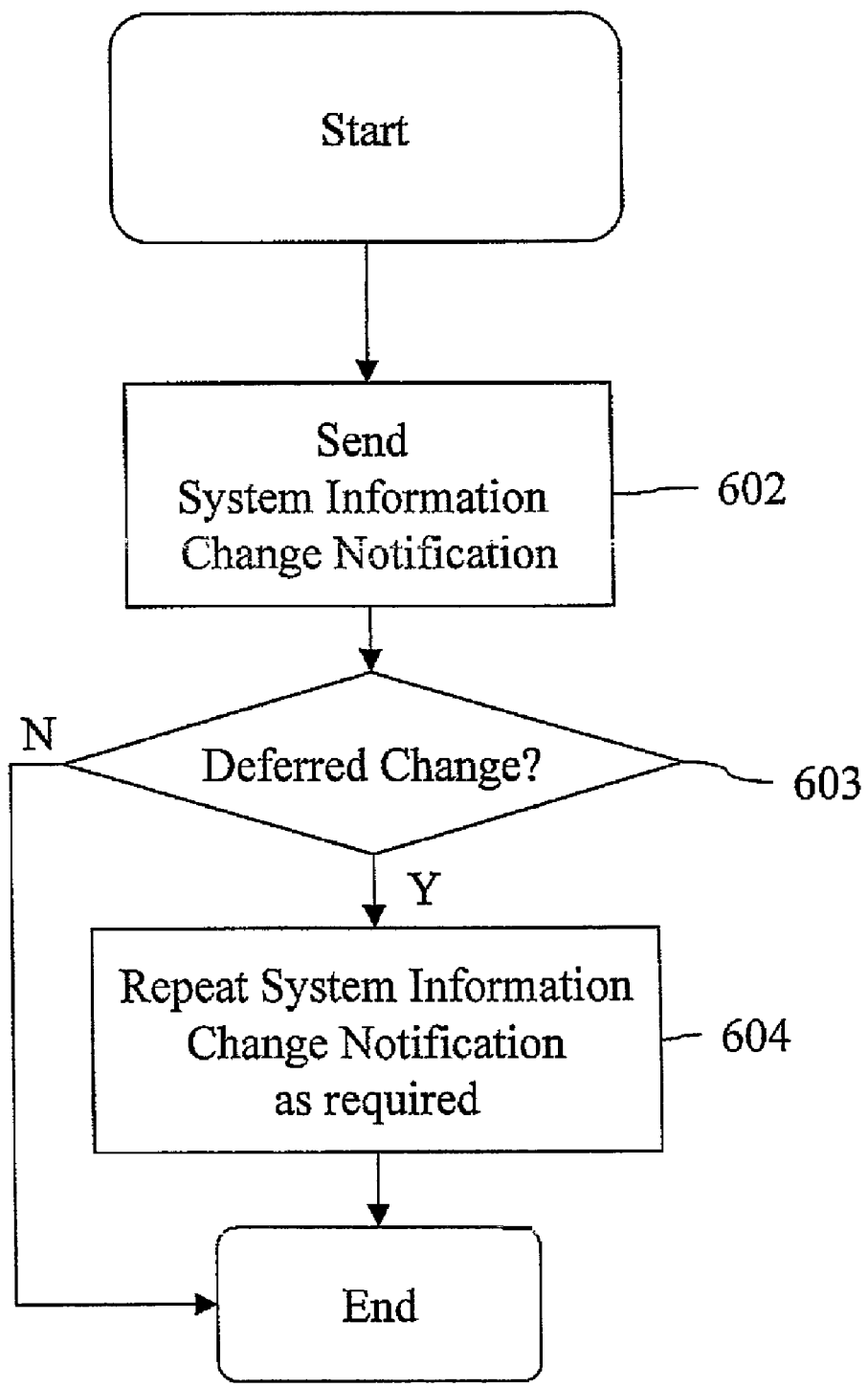
FIG. 6B is a flowchart illustrating a solution in the UTRAN for deferred system information changes.

FIG. 6B illustrates an embodiment at the UTRAN for a notification of system information change sent in a PAGING TYPE 1/SYSTEM INFORMATION CHANGE INDICATION message. This embodiment addresses notification of deferred changes by the UTRAN. The UE may be arranged to address loss of notification of non-deferred changes as described above. The UTRAN broadcasts a notification of the intent to change system information (for instance, in a PAGING TYPE 1/SYSTEM INFORMATION CHANGE INDICATION message) a first time (step 602) and then, if the notification of the intent to change system information is set for a deferred time (step 603), the UTRAN broadcasts at least one repeat of the notification of system information change in a PAGING TYPE 1/SYSTEM INFORMATION CHANGE INDICATION message to notify a UE of the intent to change system information (step 604), the repeat of the notification of a system information change being sent within a period relative to the deferred time.

Figure 7:
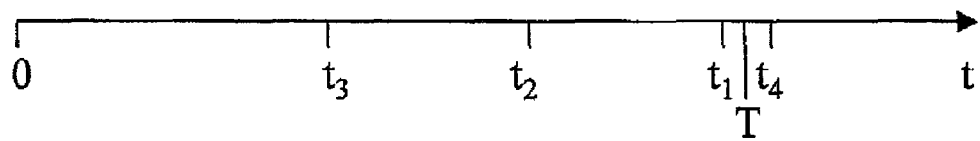
FIG. 7 shows a timing diagram to illustrate an example of a solution in the UTRAN for deferred system information changes.

FIG. 7 shows a timing diagram to illustrate an example of the operation of such an embodiment. A notification of a system information change is sent by the network at t=0. The notification of a system information change indicates that the system information change is to be implemented by a receiving device at a deferred time T. The network then sends a repeat of the notification of a system information change at a time $t_n$ relative to the deferred time T. The repeat may be sent before or after the deferred time T. In one embodiment the repeat is sent at a time $t_3$ equal or less than 50 seconds (which is around 5000 frames) before or after the deferred time T. In other embodiments this repeat is sent at a time $t_2$ equal or less than 40.96 seconds (which is one cycle of 4096 frames), 10 seconds (1000 frames), 1 second (100 frames), 100 ms (10 frames) or 10 ms (1 frame). For instance, as shown in FIG. 7, the repeat may be sent within the period between $t_1$ and T or within the period between T and $t_4$ subsequent to the deferred time T. In this latter case, the time $t_4$ is likely to be relatively soon after T (for example 10 ms or 100 ms). Alternatively the repeat may be sent at the deferred time T.

In one preferred embodiment, this repeat message is sent (as a non-deferred change) in the latest radio frame (also known as the Transmission Timing Interval or TTI) that is (a) prior to the actual system information change, and (b) a TTI for which the UE's receiver is not switched off due to discontinuous reception (DRX). For PAGING TYPE 1 messages, the radio frame used may be limited by DRX (discontinuous reception). For SYSTEM INFORMATION CHANGE INDICATION messages, the exact timing of the repeat message may be affected by other message traffic on the FACH. If the UE missed the first message (because it was not in the current cell or no PCH/FACH was configured at the time), the repeat message will be received and the UE can then acquire the updated system information when it is available. Thus the UTRAN repeats the transmission of the notification of a system information change to increase the probability of proper reception by the UE of notification of the intent to change system information by the UE.

The UTRAN may be arranged to send the repeat of the notification of a system information change at a predetermined time. Some examples of suitable times are as follows: within one frame (before or after) of the frame in which the system change is to be implemented; within 10 frames before or after; within 100 frames before or after; within 1000 frames before or after; within 4000 frames before or after. It will be appreciated by a person skilled in the art that the benefits of the technique may reduce as the time period between the repeat of the notification of a system information change and the deferred time of the system information change increases. For deferred system information changes, in one aspect the technique relates to sending a repeat of the notification of a system information change at a time that is close enough to the time of implementation of the system information change as to still be of use to the UE.

However it is also envisaged that it may be useful to send a repeat of the notification of a system information change at a time more distant from the time of implementation of the system information change. For instance, in Clause 8.1.1.4 of the 25.331 standard, it is stated that a UE should consider the content of the system information block valid until at most 6 hours after reception. Say the UTRAN sends a first SIB at t=0, then changes that SIB at t=2 hours and then changes to a third version of the SIB at t=7 hours and a UE receives the first version of the SIB (sent at t=0) but does not receive the notification of a system implementation change for the second version of the SIB (sent at t=2 hours) then at t=6 hours the UE will consider the stored SIB (the first version of the SIB) no longer valid. However if the UTRAN sends a repeat of the notification say 2 hours (t=4 hours) after the time of implementation of the system information change owing to the second version of the SIB, then the UE may receive this repeat notification before 6 hours have elapsed since the first SIB was received. The UE will then consider the second version of the SIB valid until it receives the third change notification (around t=7 hours) or until expiration of 6 hours for receiving the second version of the SIB (around t=10 hours). It may therefore prove useful for the UTRAN to be arranged to send a repeat of a notification of a system information change up to six hours (for example, five hours) from the time of implementation of the system information change.

As the UTRAN may be arranged to send this repeat, the UE does not need to be continuously monitoring the MIB looking for system information changes, which should result in a prolonged battery life for the UE. It is not important here that the time is predetermined for the UTRAN, merely that the UTRAN is going to repeat the message.

Although FIGS. 5A and 5B illustrate embodiments implemented in the UE and FIGS. 6A and 6B illustrate embodiments implemented in the network, it will be appreciated by a person skilled in the art that both approaches may be implemented in a telecommunications system. Thus the network may be arranged to send repeat transmissions of the notifications of system information changes and the user equipment may be arranged to re-read broadcast system information whenever it re-configures itself. One preferred solution is the implementation described in FIG. 5A for the UE, together with the implementation described in FIG. 6B for the network.

Figure 8:
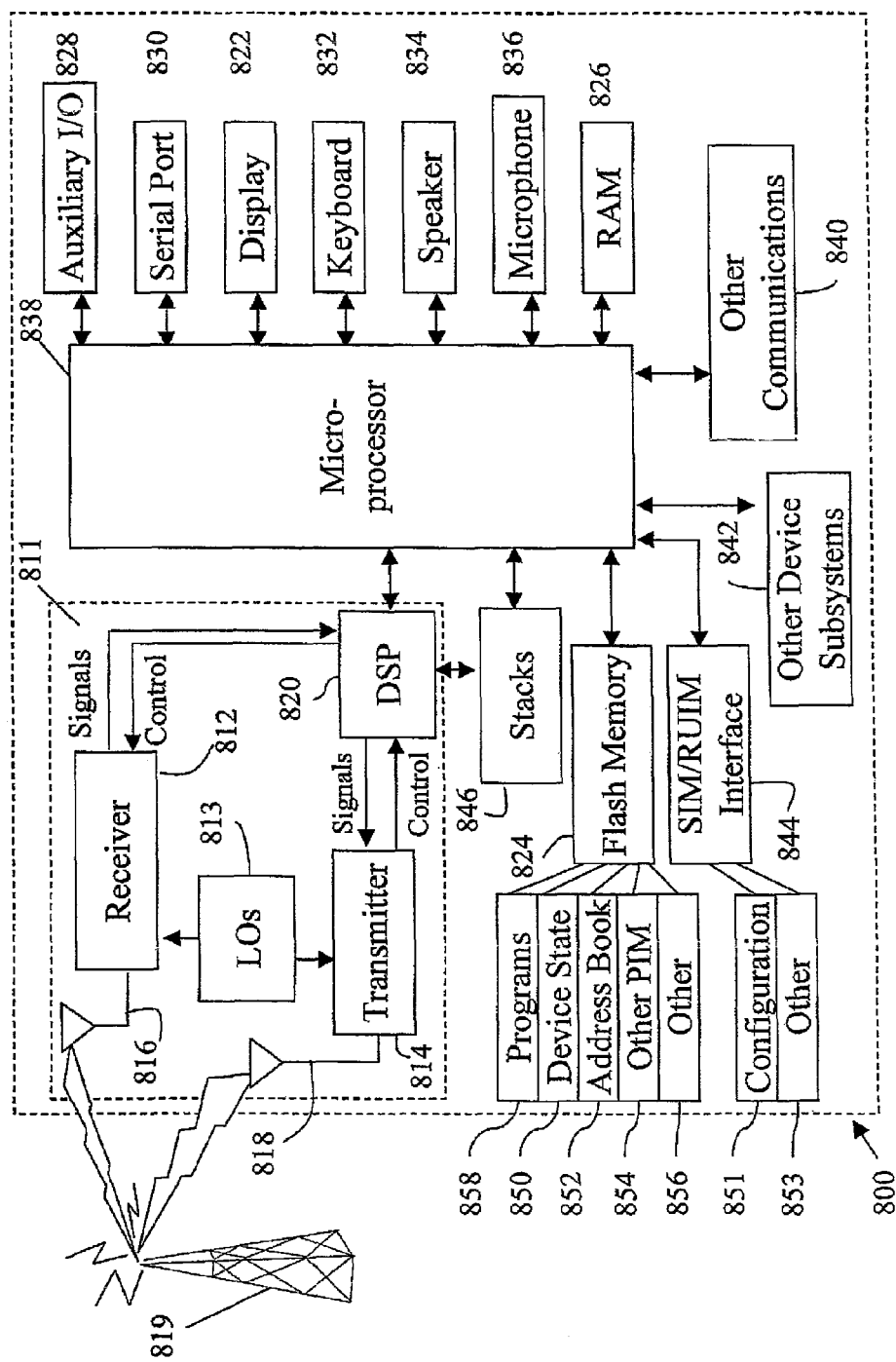
FIG. 8 is a block diagram illustrating a mobile device, which can act as a UE and co-operate with the apparatus and methods of FIGS. 1 to 7.

Turning now to FIG. 8, FIG. 8 is a block diagram illustrating a mobile device, which can act as a UE and co-operate with the apparatus and methods of FIGS. 1 to 7, and which is an exemplary wireless communication device. Mobile station 800 is preferably a two-way wireless communication device having at least voice and data communication capabilities. Mobile station 800 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 800 is enabled for two-way communication, it will incorporate a communication subsystem 811, including both a receiver 812 and a transmitter 814, as well as associated components such as one or more, preferably embedded or internal, antenna elements 816 and 818, local oscillators (LOs) 813, and a processing module such as a digital signal processor (DSP) 820. As will be apparent to those skilled in the field of communications, the particular design of the communication subsystem 811 will be dependent upon the communication network in which the device is intended to operate. For example, mobile station 800 may include a communication subsystem 811 designed to operate within the Mobitex™ mobile communication system, the DataTAC™ mobile communication system, GPRS network, UMTS network, or EDGE network.

Network access requirements will also vary depending upon the type of network 802. For example, in the Mobitex and DataTAC networks, mobile station 800 is registered on the network using a unique identification number associated with each mobile station. In UMTS and GPRS networks, however, network access is associated with a subscriber or user of mobile station 800. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 800 will be unable to carry out any other functions involving communications over the network 802. The SIM interface 844 is normally similar to a card-slot into which a SIM card can be inserted and ejected like a diskette or PCMCIA card. The SIM card can have approximately 64K of memory and hold many key configuration 851, and other information 853 such as identification, and subscriber related information.

When required network registration or activation procedures have been completed, mobile station 800 may send and receive communication signals over the network 802. Signals received by antenna 816 through communication network 802 are input to receiver 812, which may perform such common receiver functions as signal amplification, frequency down conversion, filtering, channel selection and the like, and in the example system shown in FIG. 8, analog to digital (A/D) conversion. A/D conversion of a received signal allows more complex communication functions such as demodulation and decoding to be performed in the DSP 820. In a similar manner, signals to be transmitted are processed, including modulation and encoding for example, by DSP 820 and input to transmitter 814 for digital to analog conversion, frequency up conversion, filtering, amplification and transmission over the communication network 802 via antenna 818. DSP 820 not only processes communication signals, but also provides for receiver and transmitter control. For example, the gains applied to communication signals in receiver 812 and transmitter 814 may be adaptively controlled through automatic gain control algorithms implemented in DSP 820.

Mobile station 800 preferably includes a microprocessor 838 which controls the overall operation of the device. Communication functions, including at least data and voice communications, are performed through communication subsystem 811. Microprocessor 838 also interacts with further device subsystems such as the display 822, flash memory 824, random access memory (RAM) 826, auxiliary input/output (I/O) subsystems 828, serial port 830, keyboard 832, speaker 834, microphone 836, a short-range communications subsystem 840 and any other device subsystems generally designated as 842.

Some of the subsystems shown in FIG. 8 perform communication-related functions, whereas other subsystems may provide "resident" or on-device functions. Notably, some subsystems, such as keyboard 832 and display 822, for example, may be used for both communication-related functions, such as entering a text message for transmission over a communication network, and device-resident functions such as a calculator or task list.

Operating system software used by the microprocessor 838 is preferably stored in a persistent store such as flash memory 824, which may instead be a read-only memory (ROM) or similar storage element (not shown). Those skilled in the art will appreciate that the operating system, specific device applications, or parts thereof, may be temporarily loaded into a volatile memory such as RAM 826. Received communication signals may also be stored in RAM 826.

As shown, flash memory 824 can be segregated into different areas for both computer programs 858 and program data storage 850, 852, 854 and 856. These different storage types indicate that each program can allocate a portion of flash memory 824 for their own data storage requirements. Microprocessor 838, in addition to its operating system functions, preferably enables execution of software applications on the mobile station. A predetermined set of applications that control basic operations, including at least data and voice communication applications for example, will normally be installed on mobile station 800 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 802. In a preferred embodiment, the PIM data items are seamlessly integrated, synchronized and updated, via the wireless network 802, with the mobile station user's corresponding data items stored or associated with a host computer system. Further applications may also be loaded onto the mobile station 800 through the network 802, an auxiliary I/O subsystem 828, serial port 830, short-range communications subsystem 840 or any other suitable subsystem 842, and installed by a user in the RAM 826 or preferably a non-volatile store (not shown) for execution by the microprocessor 838. Such flexibility in application installation increases the functionality of the device and may provide enhanced on-device functions, communication-related functions, or both. For example, secure communication applications may enable electronic commerce functions and other such financial transactions to be performed using the mobile station 800.

In a data communication mode, a received signal such as a text message or web page download will be processed by the communication subsystem 811 and input to the microprocessor 838, which preferably further processes the received signal for output to the display 822, or alternatively to an auxiliary I/O device 828. A user of mobile station 800 may also compose data items such as email messages for example, using the keyboard 832, which is preferably a complete alphanumeric keyboard or telephone-type keypad, in conjunction with the display 822 and possibly an auxiliary I/O device 828. Such composed items may then be transmitted over a communication network through the communication subsystem 811.

For voice communications, overall operation of mobile station 800 is similar, except that received signals would preferably be output to a speaker 834 and signals for transmission would be generated by a microphone 836. Alternative voice or audio I/O subsystems, such as a voice message recording subsystem, may also be implemented on mobile station 800. Although voice or audio signal output is preferably accomplished primarily through the speaker 834, display 822 may also be used to provide an indication of the identity of a calling party, the duration of a voice call, or other voice call related information for example.

Serial port 830 in FIG. 8, would normally be implemented in a personal digital assistant (PDA)-type mobile station for which synchronization with a user's desktop computer (not shown) may be desirable, but is an optional device component. Such a port 830 would enable a user to set preferences through an external device or software application and would extend the capabilities of mobile station 800 by providing for information or software downloads to mobile station 800 other than through a wireless communication network. The alternate download path may for example be used to load an encryption key onto the device through a direct and thus reliable and trusted connection to thereby enable secure device communication.

Other communications subsystems 840, such as a short-range communications subsystem, is a further optional component which may provide for communication between mobile station 800 and different systems or devices, which need not necessarily be similar devices. For example, the subsystem 840 may include an infrared device and associated circuits and components or a Bluetooth™ communication module to provide for communication with similarly enabled systems and devices.

When mobile device 800 is used as a UE, protocol stacks 846 include apparatus and a method for handling messages that relate to a cell other than the currently operating cell in universal mobile telecommunications system user equipment.

Extensions and Alternatives

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have shown steps being carried out in a particular order. However, it would be clear to a person skilled in the art that the order of the evaluation of some of the steps is immaterial with respect to the operation of the method. The ordering of the steps as described herein is not intended to be limiting.

It is also to be noted that where a method has been described it is also intended that protection is also sought for a device arranged to carry out the method and where features have been claimed independently of each other these may be implemented together with other claimed features.

The invention claimed is:

1. A method for enabling configuration changes in a user equipment device (UE), the UE configurable for use in a mobile telecommunications system, the method comprising:
   starting a deferred system information change timer after the UE has configured a Paging Channel (PCH) or Forward Access Channel (FACH);
   reading a first Master Information Block (MIB) comprising a first value tag;
   comparing the first value tag with a stored value tag;
   updating stored system configuration information from the first MIB if the value tags are different;
   not changing stored system configuration information if the value tags are the same;
   allowing the use of the stored system information if the deferred system information change timer is expired; and
   waiting for a second MIB if the deferred system information change timer is not expired.

2. The method of claim 1 wherein waiting for a second MIB comprises waiting for a prescribed amount of time and then reading a next MIB received by the UE as the second MIB.

3. The method of claim 2 wherein the time used for the prescribed amount of time is one Transmission Time Interval (TTI).

4. The method of claim 1 wherein waiting for a second MIB comprises reading every MIB received by the UE.

5. A user equipment device (UE) configurable to operate in a mobile telecommunications system, the UE comprising:
   a processor operably disposed in the UE and communicable with stored instructions and data;
   a transceiver configured to send and receive messages and in operable communication with the processor;
   the processor and stored instructions configured to start a deferred system information change timer after the UE has configured a Paging Channel (PCH) or Forward Access Channel (FACH), and to compare a first value tag received in a first Master Information Block (MIB) after the timer has started to a stored value tag; and
   where the processor and stored instructions and data are further configured to update stored system configuration information from the first MIB if the value tags are different and otherwise not change stored system configuration information, and further configured to use the stored system information if the deferred system information change timer is expired or wait for a second MIB if the deferred system information change timer is not expired.

6. The UE of claim 5 wherein the wait for a second MIB comprises waiting for a prescribed amount of time and then reading a next MIB received by the UE as the second MIB.

7. The UE of claim 6 wherein the time used for the prescribed amount of time is one Transmission Time Interval (TTI).

8. The UE of claim 5 wherein the wait for a second MIB comprises reading every message containing a MIB received by the UE.

* * * * *